(12) United States Patent
Ornig et al.

(10) Patent No.: US 6,719,355 B2
(45) Date of Patent: Apr. 13, 2004

(54) MOTOR VEHICLE DOOR WITH A PASSENGER PROTECTION SYSTEM

(75) Inventors: Adolf Ornig, Unterpremstetten (AT); Gernot Bindar, Gossendorf (AT); Martin Graupp, Graz (AT); Wolfgang Dietz, Graz (AT); Gabriela Paier, Graz (AT)

(73) Assignee: Magna Steyr Fahrzeugtechnik AG & Co. KG, Hauptstrasse (AT)

( * ) Notice: Subject to any disclaimer, the term of this patent is extended or adjusted under 35 U.S.C. 154(b) by 0 days.

(21) Appl. No.: 10/312,824

(22) PCT Filed: Jun. 28, 2001

(86) PCT No.: PCT/AT01/00213
§ 371 (c)(1),
(2), (4) Date: Dec. 27, 2002

(87) PCT Pub. No.: WO02/00461
PCT Pub. Date: Jan. 3, 2002

(65) Prior Publication Data
US 2003/0107236 A1 Jun. 12, 2003

(30) Foreign Application Priority Data
Jun. 28, 2000 (AT) ......................................... 478/2000 U (51) Int. Cl.[7] .................................................. B60J 5/04
(52) U.S. Cl. ................................ 296/146.5; 296/146.6; 296/146.7; 49/502
(58) Field of Search .......................... 296/146.1, 146.5, 296/146.6, 146.7; 49/502

(56) References Cited

U.S. PATENT DOCUMENTS 5,056,264 A * 10/1991 Jewell, II et al. ............. 49/502
6,035,601 A * 3/2000 Yamaguchi et al. ...... 296/146.5
6,176,542 B1 * 1/2001 Gooding et al. ......... 296/146.6
6,231,112 B1 * 5/2001 Fukumoto et al. ....... 296/146.5
6,328,373 B1 * 12/2001 Pacella et al. ........... 296/146.5
6,332,641 B1 * 12/2001 Okana ...................... 296/146.6
6,381,906 B1 * 5/2002 Pacella et al. ................. 49/502
6,412,852 B1 * 7/2002 Koa et al. ................. 296/146.7
6,508,035 B1 * 1/2003 Seksaria et al. ............... 49/502
6,536,832 B1 * 3/2003 Grimm et al. ........... 296/146.6
6,543,839 B1 * 4/2003 Gfrerrer et al. .......... 296/146.6
6,550,846 B1 * 4/2003 Chappuis et al. ........ 296/146.5
6,619,724 B2 * 9/2003 Blomeling et al. ...... 296/146.5

* cited by examiner

Primary Examiner—D. Glenn Dayoan
Assistant Examiner—Greg Blankenship
(74) Attorney, Agent, or Firm—Bachman & LaPointe, P.C.

(57) ABSTRACT

A motor vehicle door having a door inside part (19), a door outside part (20) and a supporting panel (3) which is connected in a tight-fitting manner to the door inside part (19). The supporting panel (3) is a structural part made of a reinforced plastic, extends essentially over the surface of the door and has an edge (30, 31, 32, 33) all the way around, a first frame plate (4) and a second frame plate (5) are connected to the edge of the supporting panel (3), said frame plates being folded profiles -which extend along the vertical parts of the edge, the first limb (42, 55) being connected to the edge (30, 31) of the supporting panel (3), the door inside part (19) is a shell made of plastic with fitting surfaces (49, 83) to which the second limbs (43, 56) of the frame plates (4, 5) and the supporting panel (3) are fastened, and the door inside part (19) protrudes outward over the supporting panel (3) and forms a connecting flange (50, 63), the door outside part (20) is a skin which is fastened to the connecting flange (50, 63) by means of a fastener (59).

17 Claims, 10 Drawing Sheets

MOTOR VEHICLE DOOR WITH A PASSENGER PROTECTION SYSTEM

BACKGROUND OF THE INVENTION

The invention concerns a motor vehicle door, comprising a door inside part, a door outside part and a supporting panel which is connected in a tight-fitting manner to the door inside part. The door inside part and door outside part are conventional sheet-metal shells which also form the window frame and to which the hinges, the door lock and optionally a door stopper are fitted; the supporting panel bears the diverse assemblies, such as window guides and window openers, and recently also has been given the task of protecting the occupants during lateral and frontal collisions. The relevant regulations are becoming ever stricter. Because of them, there is an increase, on the one hand, in the safety requirements but, on the other hand, the production costs have to drop.

DE 198 09 750 A1 discloses a motor vehicle door in which a very stiff supporting panel is clamped between the two sheet-metal shells. Although said supporting panel provides very good protection against penetration during a lateral collision, its small degree of extension means that the deformation distances are too small for effective retardation. The clamping between the sheet-metal shells in the plane of the supporting panel does not permit any effective sealing between the outer space of the door, in which the window is guided, and the inner space, in which the electrics are accommodated. The two sheet-metal shells are bulky and complex punched parts, the precisely fitting joining together of which is difficult during assembly. A door constructed in this manner is still heavy and cannot be used for different vehicle variants (for example, coupe and convertible). But this is precisely what is desirable for reducing costs.

DE 197 44 810 A1 discloses a motor vehicle door in which a frame module can be lowered from above into a door box comprising two sheet-metal shells. The frame module has, below the window opening, a module carrier which forms a blocking layer and bears diverse assemblies. This achieves a limited modularity of the door because the door box only forms the basic door below the window, but does not achieve a noticeable reduction in weight or a further reduction in costs.

In the case of the door of the "SMART" car known in practice, hinges, the lock, the guides of frameless windows, diverse assemblies and an interior covering are fitted to an inner supporting framework consisting of light metal profiles. The outer skin is only pushed onto the supporting framework. Although this construction is light in weight, it cannot be satisfactory with regard to occupant protection for vehicles of normal dimensions. In addition, the outer skin can easily be removed from the outside, which is an invitation for thieves.

It is the object of the present invention to provide a door construction which considerably surpasses known constructions with regard to safety, protection of the occupants, weight and costs. The reduction in the costs requires modularization to the greatest possible extent, i.e. the basic elements of supporting panel, interior covering and outer skin have to be able to be combined with one another in different variants.

SUMMARY OF THE INVENTION

The foregoing object is achieved by providing a supporting panel consisting of a reinforced plastic is a solid structural part which satisfies all static and dynamic load situations, such as frontal collision, side collision, quasi-static door indentation, door depression and door overcompression. It also serves as a support for all of the door assemblies and the door covering. On account of the tight-fitting fastening, it also serves as a separation of wet zone and dry zone, with the window on the outer side of the supporting panel being situated in the wet zone. Given appropriate selection of material, the solid supporting panel may also serve as attack-proof armor-plating.

The connection of the edge of the supporting panel in its plane to a first and a second frame plate can be screwed or riveted and permits tolerance compensation, which facilitates the assembly and improves the fitting precision of the finished door. Since the frame plates are folded profiles, they can be deformed in the event of a collision and thus compensate for the small deformation distance of the stiff supporting panel. This effect is further increased by the first, parallel limb of the profile being connected to the edge of the supporting plate and its second limb being directed transversely to the surface of the door and being deformed in the case of a collision.

Since the door inside part is a shell consisting of plastic, stiffness matching the function is obtained even with a small wall thickness. The shell is of such a depth that the door inside part protrudes outward over the supporting panel and forms a connecting flange. In the interior of the shell, the supporting panel bears completely or at points against first fitting surfaces via the frame plates and bears directly against a second fitting surface and is fastened there in a tight-fitting manner in each case. The fastening takes place by means of screws or rivets which again also permit tolerance compensation. The solid supporting panel, which is connected in a tight-fitting manner to the door inside part consisting of plastic, also provides audibly better muffling of noises.

The door outside part is a skin which is fastened in a positive manner to the connecting flange. Said door outside part can consist of any desired material (steel, light metal or plastic) because it does not come into contact with the metallic frame. Thus, electrochemical reactions cannot occur. The positive connection is only accessible with the door open, i.e. security against theft is increased. With the door open, it can, however, easily be interchanged, which is an advantage in the case of relatively light damage or for individuals wanting different colored doors. The relatively flat shape of the outer skin furthermore results in simple production and free selection of the material.

The first frame plate is preferably connected to hinges and the second frame plate is preferably connected to a door lock. Force is therefore introduced from the supporting panel directly to the hinges or to the lock without loading the door inside part.

In a development of the invention, a collision protection support is provided which is fastened by its ends to the first and second frame plates outside the supporting panel Since it is outside the supporting panel, it thus has a relatively large deformation distance even before the supporting panel comes into effect.

The profile of the first and second frame plates preferably has, at least in part, a third limb which is approximately parallel to the first limb and is outside the latter. This third limb not only stiffens the frame plate and enlarges its capacity for absorbing deformation energy; it is also to be intended that the collision protection support is fastened to it. The fastening to the frame plate again provides direct introduction of force into the lock and hinges with an interaction between the supporting panel and collision protection support being provided via the frame plate.

A further aspect of the invention comprises the first and second frame plates extending as far as the lower edge of the window opening, and a separate window frame being placed on the upper edge of the supporting panel and being fastened to the first limb and to third limb of the profile. This means, first of all, that the door can be used both with and without window frames (as a frameless window for Cabriolets). In this case, the resting on the supporting panel and the adjustable connection to the frame permits sufficiently stiff fastening and precise adjustment during assembly. The latter because the first and third limbs of the profile are parallel and at some distance from each other. This is a substantial step to complete modularity.

Within the context of the invention, the supporting panel itself can differ greatly in design. In a particularly suitable design, it comprises an inner wall and an outer wall consisting of fiber-reinforced plastic, which walls are connected to each other at least along the edge, and cavities being provided between the walls. They can also be connected in the meantime by inwardly directed ribs. This produces maximum stiffness at the lowest weight. The fastening elements then engage on the common edge. There is thus a solid separating wall between the wet zone and dry zone. No damage is done if the supporting panel has an aperture which forms an inner edge and at which the walls are connected to each other. On the contrary: if the window opener motor is accommodated in this aperture and is connected in a tight-fitting manner to the inner edge, its electrics are situated in the dry zone—and, as a result, conventional plugs are sufficient—and its output is situated in the wet zone which also contains the window.

In an advantageous development of the invention, the supporting panel has integrated metallic inserts for fastening means Said inserts can be molded metal parts, in particular threaded bushings, and can accommodate the fastening means for the frame plates and also the fastening means for diverse, further assemblies, for example the window guides on the side facing the door outside part.

A further step toward producing full modularity comprises the door inside part having, on its surface facing the vehicle interior, inserts or openings for the attachment of insert parts or covering parts. Said parts can then be used as desired in various furnishing variants, colors or qualities. In the extreme case, the openings can be so large that the door inside part just forms a frame into which then an entire door interior covering complete with loudspeakers etc. can be inserted.

In a preferred development, the door inside part has, on its upper edge, a window seal and plug-in elements with which it is placed, vertically onto the supporting panel. The door inside part therefore extends as far as the window, is securely fastened and yet can easily be fitted.

In a development, the door inside part has a peripheral rubber seal which bears against the supporting panel. In the case of particularly exacting requirements or in complicated situations, this measure can improve the sealing of the dry zone and at the same time acts in a noise-isolating manner. There are exacting requirements, for example, if the cabling is pre-assembled on the inside of the door inside part and normal lines and plugs are used and are to last for a long time.

In a development of the invention, provision is made for the door outside part to have, on its three edges which are connected to the door inside part, inwardly folded zones with holes in which the positive fastening means engage through holes in the connecting flange. In this manner, the connection is not only inaccessible with the door closed, but is also invisible. If it is also to be invisible with the door open and is additionally to be protected from moisture, then a sealing lip can be provided on the connecting flange on the door inside part, said sealing lip overlapping the positive fastening means on that side of the door inside part which faces away from the door outside part. Finally, the door outside part can have a reinforcement and a window seal on its upper edge.

BRIEF DESCRIPTION OF THE DRAWINGS

The invention will be described and explained below with reference to figures, in which:

FIG. 2, sheet A and sheet B, shows an exploded drawing of the door in FIG. 1,

FIG. 8 shows a section 8—8 in FIG. 1,

DETAILED DESCRIPTION

Figure 1:
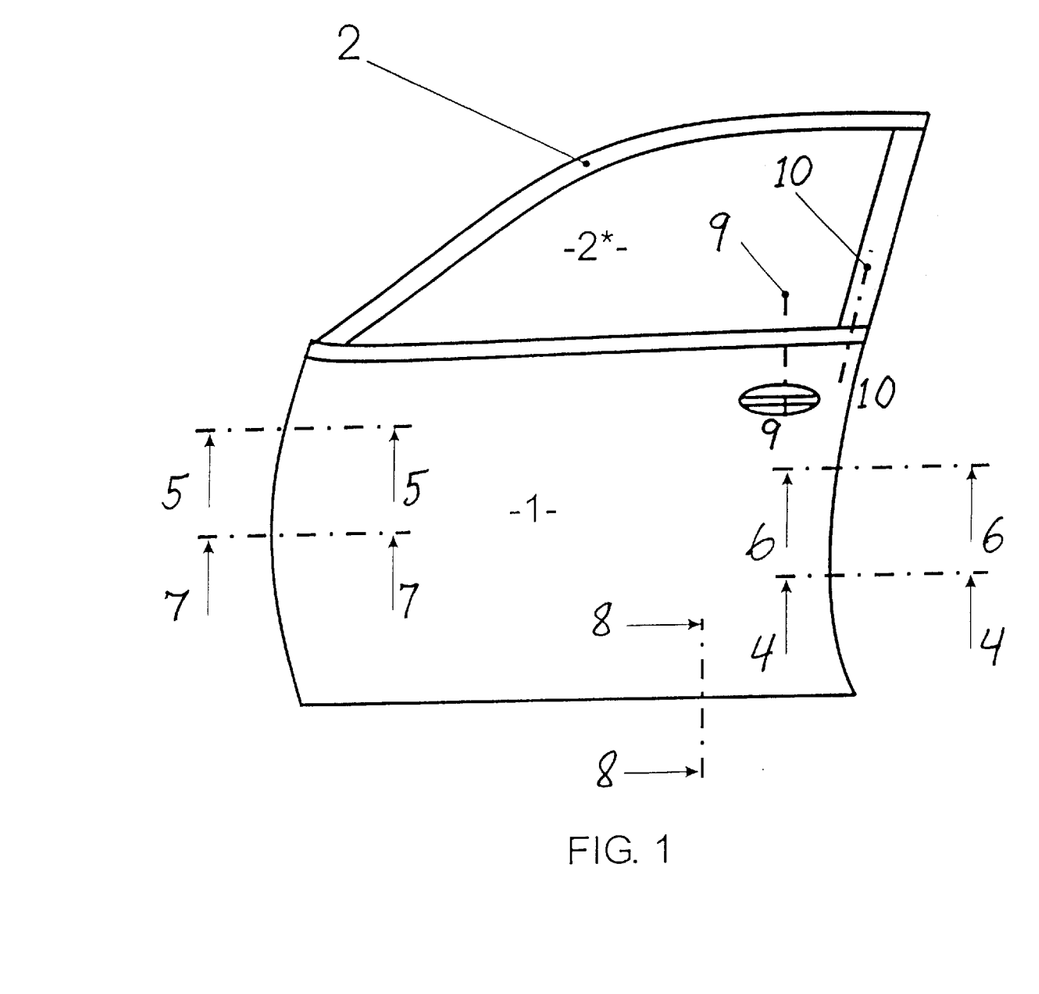
FIG. 1 shows a schematic outside view of a door according to the invention.

In FIG. 1, the basic door is denoted by 1 and is also called surface of the door in the context of the invention. A window frame 2, which bounds the window surface 2* upward and laterally is situated above said door. Otherwise, FIG. 1 serves in particular for specifying the position of the sections illustrated in FIG. 4 to FIG. 10.

Figure 2A:
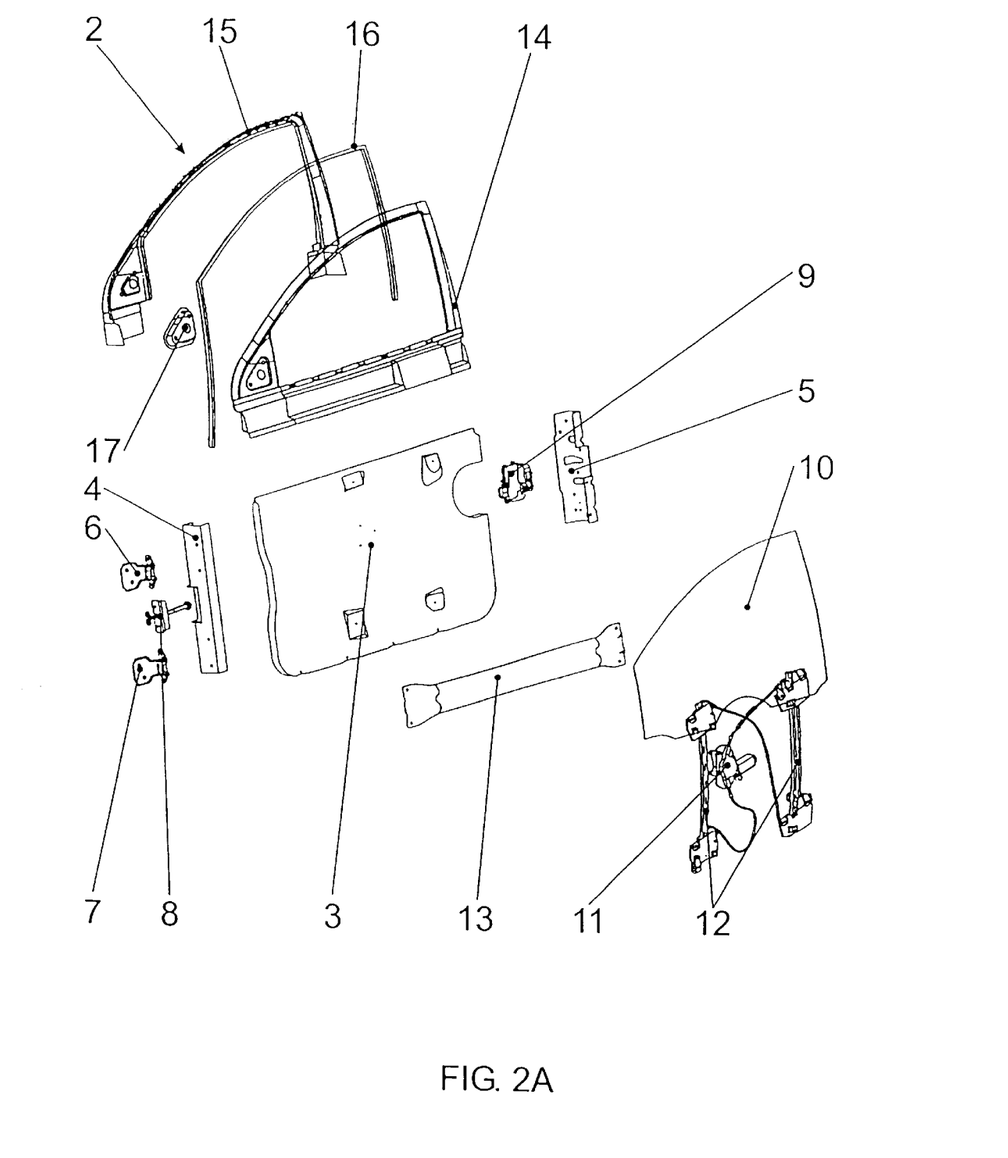

FIG. 2 shows the components of the door according to the invention distributed over two sheets (A, B). They are mentioned in the order of their assembly. In FIG. 2A, a supporting panel is denoted by 3. It consists of reinforced plastic, extends essentially over the surface of the basic door 1 and, is designed and dimensioned in such a manner that it withstands all static and dynamic actions of force. It is connected fixedly, but releasably, on its vertical, front part of the edge to a first frame plate 4 and on its rear part of the edge to a second frame plate 5. Hinges 6, 7 and, in between, a door stopper 8 are screwed to the first frame plate; a door lock 9 is screwed to the second frame plate 5. A window 10 with window opener, window opener motor 11 and window guides with fastening bases 12 are screwed to the outer side of the supporting panel 3, which can be seen in the FIG. A collision protection support 13 is then fitted on that side of the window 10 which faces away from the supporting panel 3, and is screwed to the frame plates 4, 5.

The window frame 2 comprises an outer window frame 14, an inner window frame 15, a window seal 16 and a mirror support 17. These parts are connected to one another, are placed onto the supporting panel 3 and are connected to the frame plates 4, 5 in a manner yet to be described.

Figure 2B:
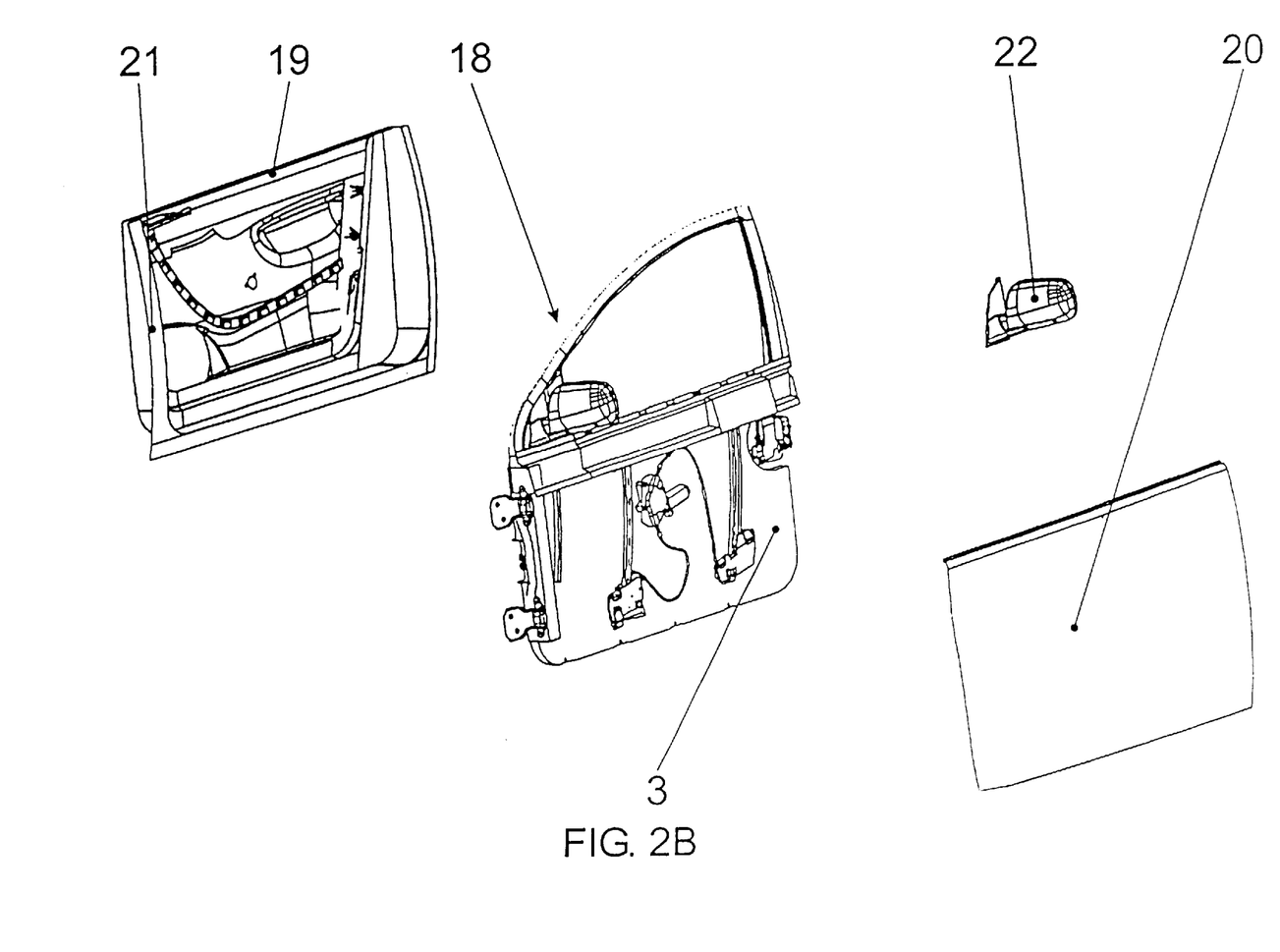

FIG. 2B illustrates the supporting plate 18 which has been completely equipped in this manner. It is now inserted into a door inside part 19 Sand connected to the latter. The door inside part 19 is of shell-shaped design, the edges of the shell protrude outward over the supporting panel 3 and end in a connecting flange which is denoted in general by 21 and to which the door outside part 20 is then fastened from the outside. The tight-fitting connection between supporting panel 3 and door inside part creates a dry space between the two. The space between the supporting panel 3 and the door outside part 20 is a wet space. Finally, the outside mirror 22 is also fitted.

Figure 3:
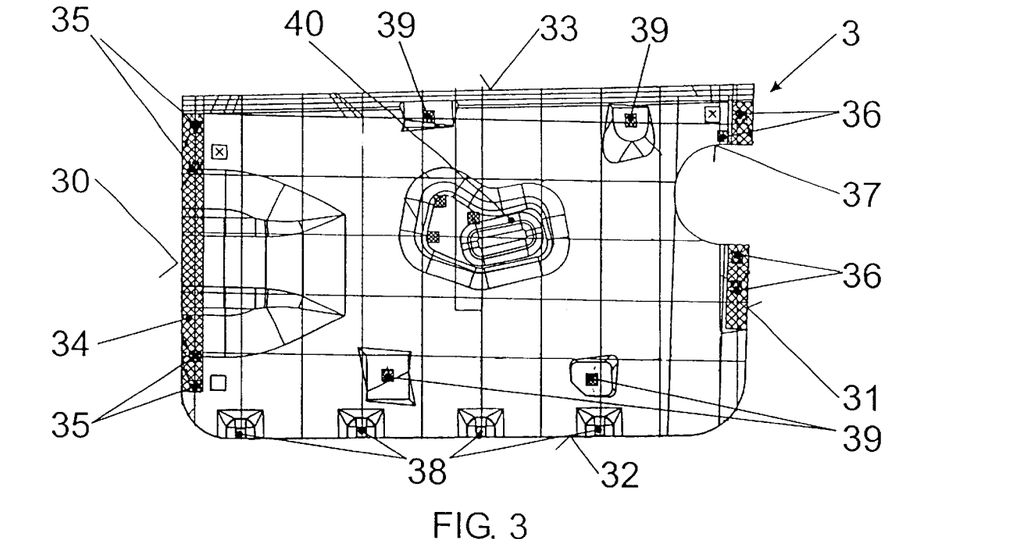
FIG. 3 shows a view of part of the door according to the invention.

FIG. 3 shows a view of the supporting panel 3 from the outside of the vehicle. It comprises an inner wall and an outer wall, consisting of fiber-reinforced plastic, which walls are connected to each other at least along the edge and contain cavities between them. This cannot be seen in FIG. 3 and reference is made in this regard to DE 198 09 750 A1 by the same applicant. The supporting panel 3 has a front, vertical edge 30, a rear, vertical, edge 31, a lower edge 32 and an upper edge 33. On the front edge 30, a support 34 (cross-hatched) for the first frame plate 4 is provided with metallic inserts 35 for fastening it. A support for the second frame plate 5 (cross-hatched) and inserts 36 for fastening it are provided on the rear edge 31. Furthermore, a cutout 37 can be seen in the rear edge 31, which creates space for the door lock 9. On the lower edge 32 are inserts 38 for the connection to the door inside part 19. Further inserts 39 are for the fastening of the bases of the window guide 12. Provided approximately in the center of the supporting panel 3 is an aperture 40 in which the two walls of the supporting panel 3 are connected to each other and form an inner edge to which the window, opener motor 11 is fastened. In this manner, the aperture 40 is sealed by the window opener motor 11, but permits the supply of power to the latter from the dry space formed on the inside of the supporting panel 3.

Figure 4:
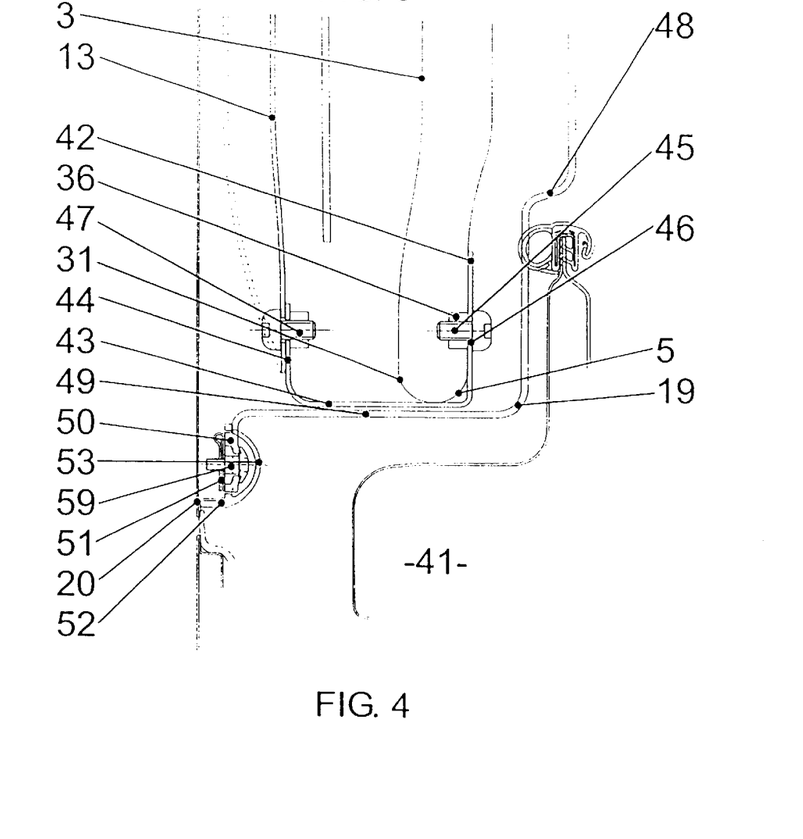
FIG. 4 shows a section 4—4 in FIG. 1.

FIG. 4 shows, in a horizontal section, the connection of the rear edge 31 of the supporting panel 3 to the second frame plate 5. For orientation purposes, the B-pillar 41 is indicated. The cross section of the second frame plate 5 consists of a first limb 42, a second limb 43 and a third limb 44. The first limb 42 is connected to the supporting panel 3. This takes place by means of bolts 45 which are screwed into the inserts 36 in the supporting panel 3. For tolerance compensation, the diameter of the holes 46 in the first limb 42 is larger than the diameter of the bolt 45. The door inside part 19 comprises an essentially planar vehicle-inside wall part 48 which is optionally perforated (not illustrated), and a shell wall 49 which runs parallel to the second limb 43 without touching the latter. The third limb 44 is approximately parallel to the first limb 42 and the collision protection support 13 is fastened to it by means of bolts 47. The tolerance compensation described with reference to the bolt 45 is also provided here.

The shell wall 49 of the door inside part 19 protrudes outward over the supporting panel 3 and the second frame plate 5 and forms a connecting flange 50 to which the door outside part 20 is fastened by means of positive fastening means 59, for example is screwed on or clipped on. So that this fastening is invisible and inaccessible from the outside of the vehicle, the door outside part is folded inward there and is provided with an insertion plate 51. If the fastening is also to be invisible and protected even with the door open, a seal 52 having an overlapping sealing lip 53 is provided.

Figure 5:
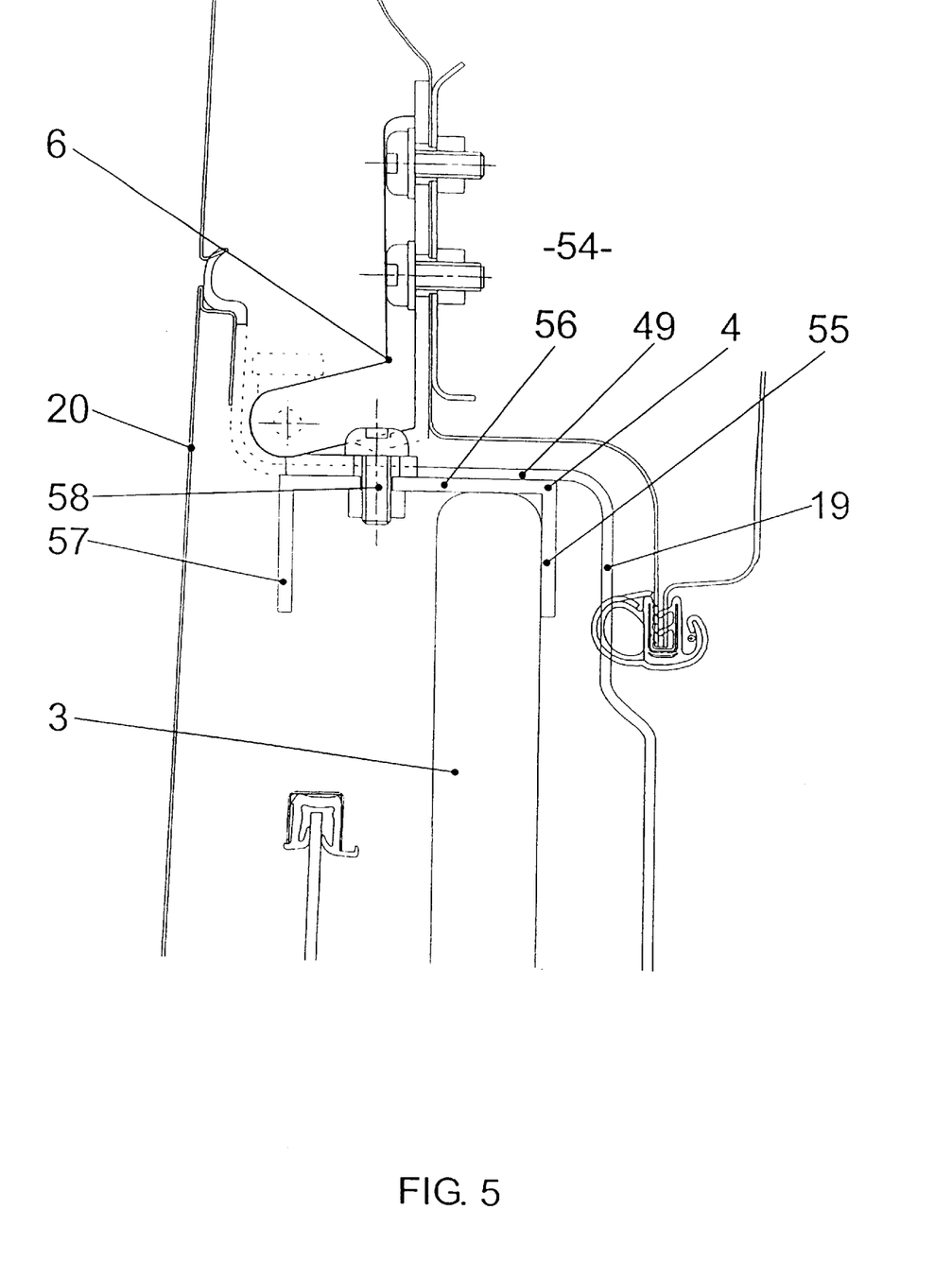
FIG. 5 shows a section 5—5 in FIG. 1.

FIG 5 is a horizontal section level with the upper hinge 6. The profile of the first frame plate 4 again consists of, a first limb 55, a second limb 56 and a third limb 57. Again in the manner described with reference to FIG. 4, the supporting panel 3 is fastened to the first limb (55) and the hinge 6 to the second limb (56), the shell wall 49 of the door inside part 19 being clamped into place here at the same time. The fastening takes place by means of bolts 58, again with the described tolerance compensation. For orientation purposes, the A-pillar 54 together with the door seal (not specifically denoted) is indicated.

Figure 6:
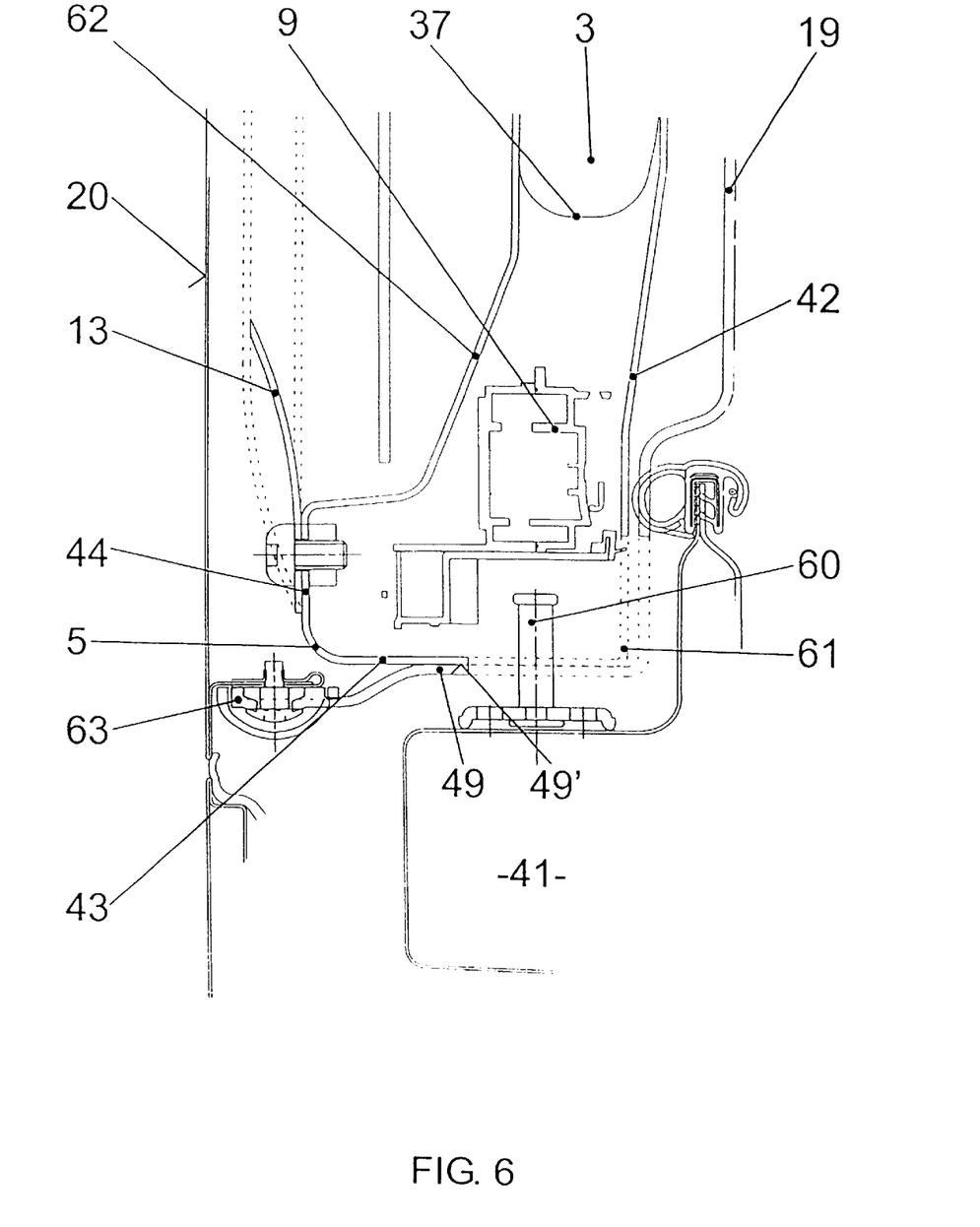
FIG. 6 shows a section 6—6 in FIG. 1.

FIG. 6 is the horizontal section in the region of the door lock on the rear, vertical edge 31 of the door. Owing to the cutout 37 in the supporting panel 3, the cross section of the second frame plate 5 is extended to this height. The cutout 37 creates space for the door lock 9 (merely indicated here) which interacts with a locking pin 60 fastened to the B-pillar 41. The door lock 9 is screwed to the second frame plate 5, it not being possible to see this in the FIG. The second limb 43 of the second frame plate 5 is connected at this height to the shell wall 49 of the door inside part 19 and the third limb 44 is continued as far as the supporting panel 3. A cutout 61 for the entry of the locking pin 60 is provided in the door inside part 19 and in the limbs 42, 43 of the frame plate 5. The shell part 49 forms here a fitting surface 49' for the second frame plate 5. A connecting flange 63 for the fastening of the door outside part 20 is again provided on the edge of the shell part 49. In a departure from FIG. 4, said connecting flange is arranged normally here sand not parallel to the surface of the door outside part.

Figure 7:
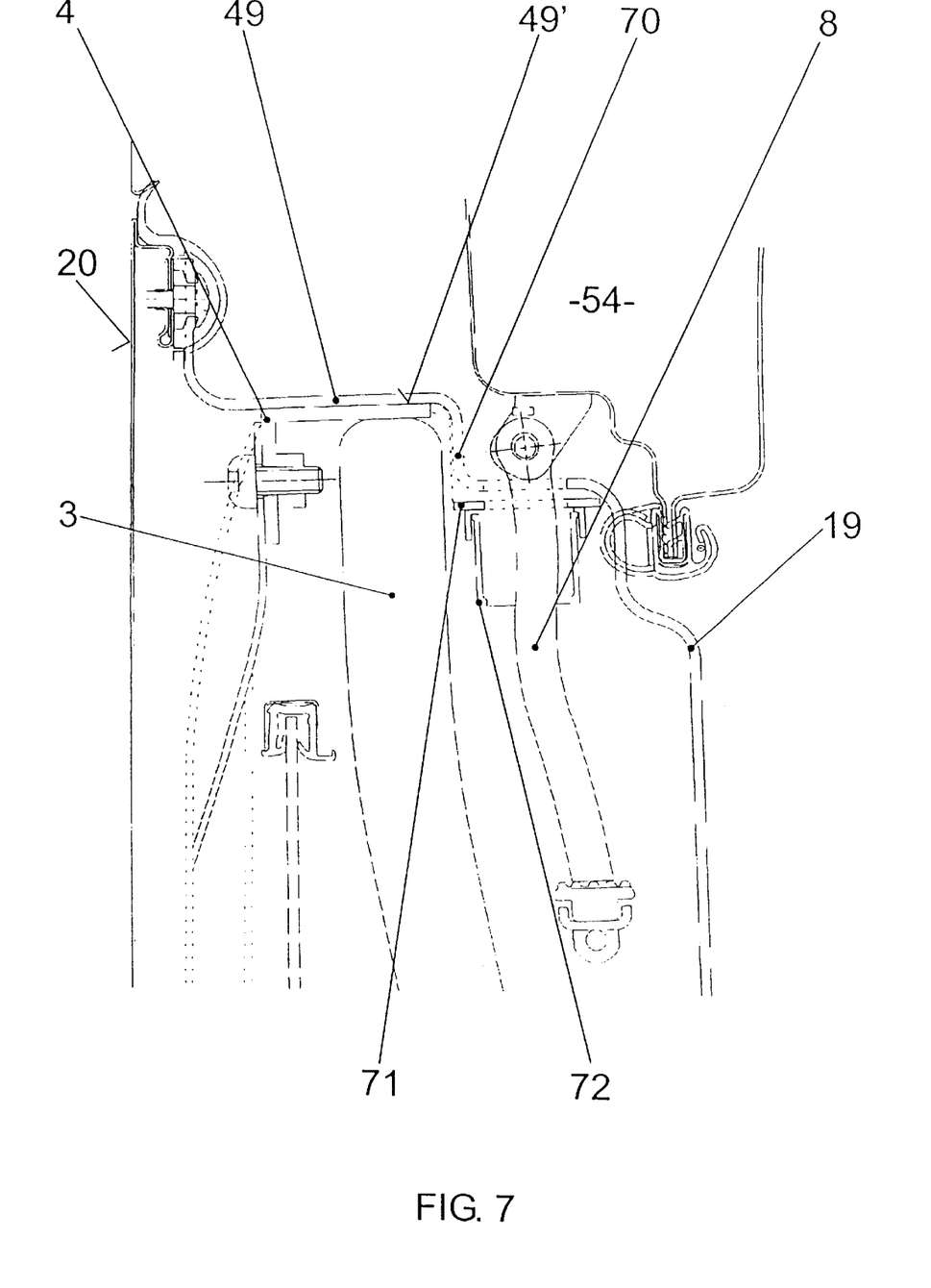
FIG. 7 shows a section 7—7 in FIG. 1.

FIG. 7 is a horizontal section level with the door stopper 8. It differs from that of FIG. 5 by, on account of the door stopper 8, the door inside part 19 having an opening 70 and the first frames plate 4 having an inwardly folded part 71 having a punched-out area to which the stop 72 for the door stopper 8 is fastened.

FIG. 8 is a vertical section in the zone of the lower edge 32 of the supporting panel 3 and a door sill 80. The door inside part 19 here has a sealing rib 82 onto which a rubber seal 81 is placed. The latter can be provided for better sealing of the dry space and can bear against the supporting panel 3 along any desired, closed line. The supporting panel 3 is screwed to a second fitting surface 83 by means of bolts 84. Sockets 38 are again let into the supporting panel, on its lower edge 32. The inside diameter of said sockets can again be larger than the diameter of the bolt 84, for the purpose of tolerance compensation during assembly.

Figure 9:
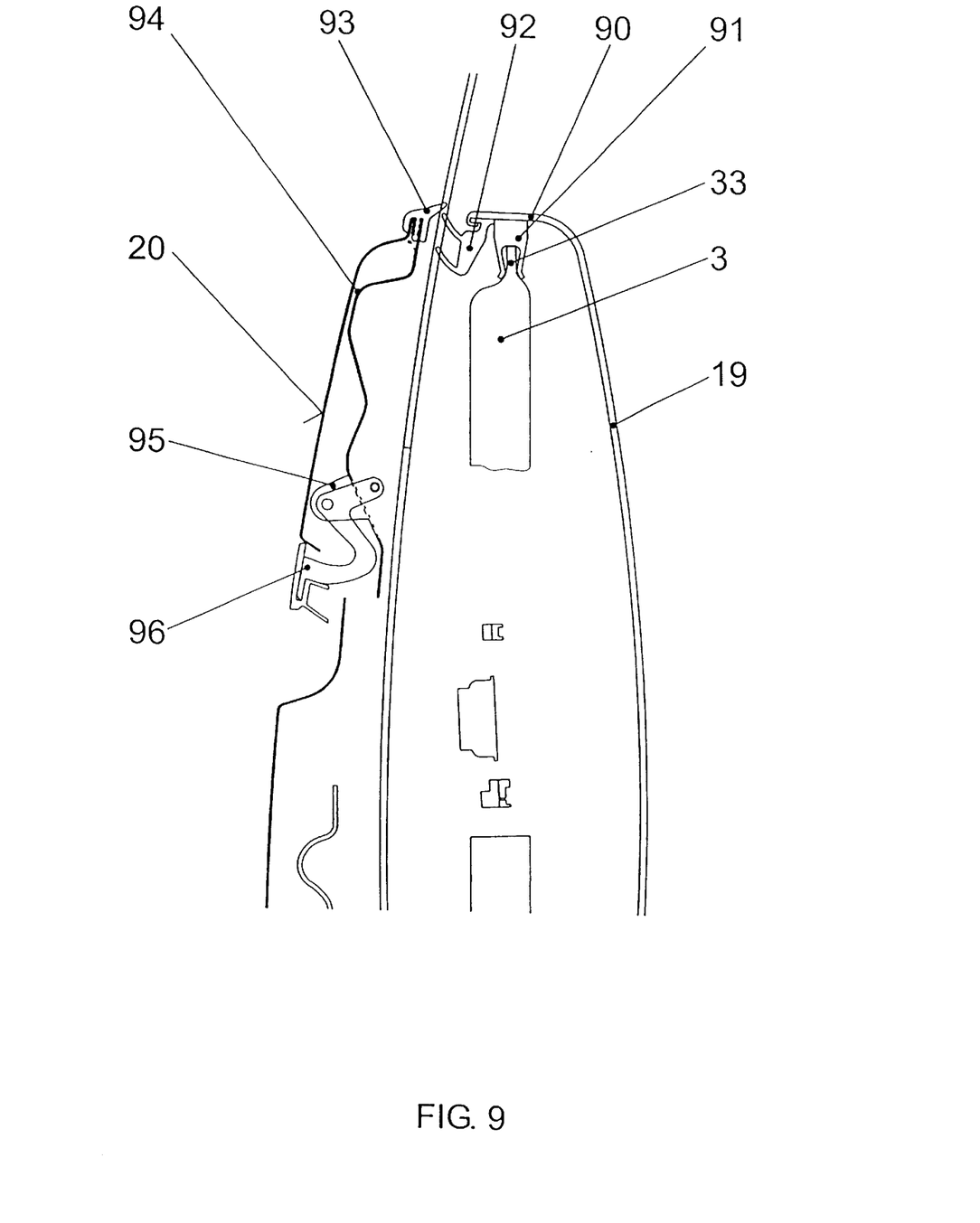
FIG. 9 shows a section 9—9 in FIG. 1.

FIG. 9 is a vertical section through the region of the upper edge 33 of the supporting panel 3. The door inside part 19 is bent outward at the top and forms a horizontal edge zone 90 in which inner plug-in elements 91, which are placed onto the upper edge 33 of the supporting panel 3, are provided. Furthermore, an inner window seal 92 is fitted in the horizontal edge zone 90. An outer window seal 93 is placed onto the upper edge of the door outside part 20 and onto a reinforcement 94 connected to the latter. Further downward, this reinforcement 94 can have two bearing tabs 95 on which an outer door handle 96 is mounted pivotably.

Figure 10:
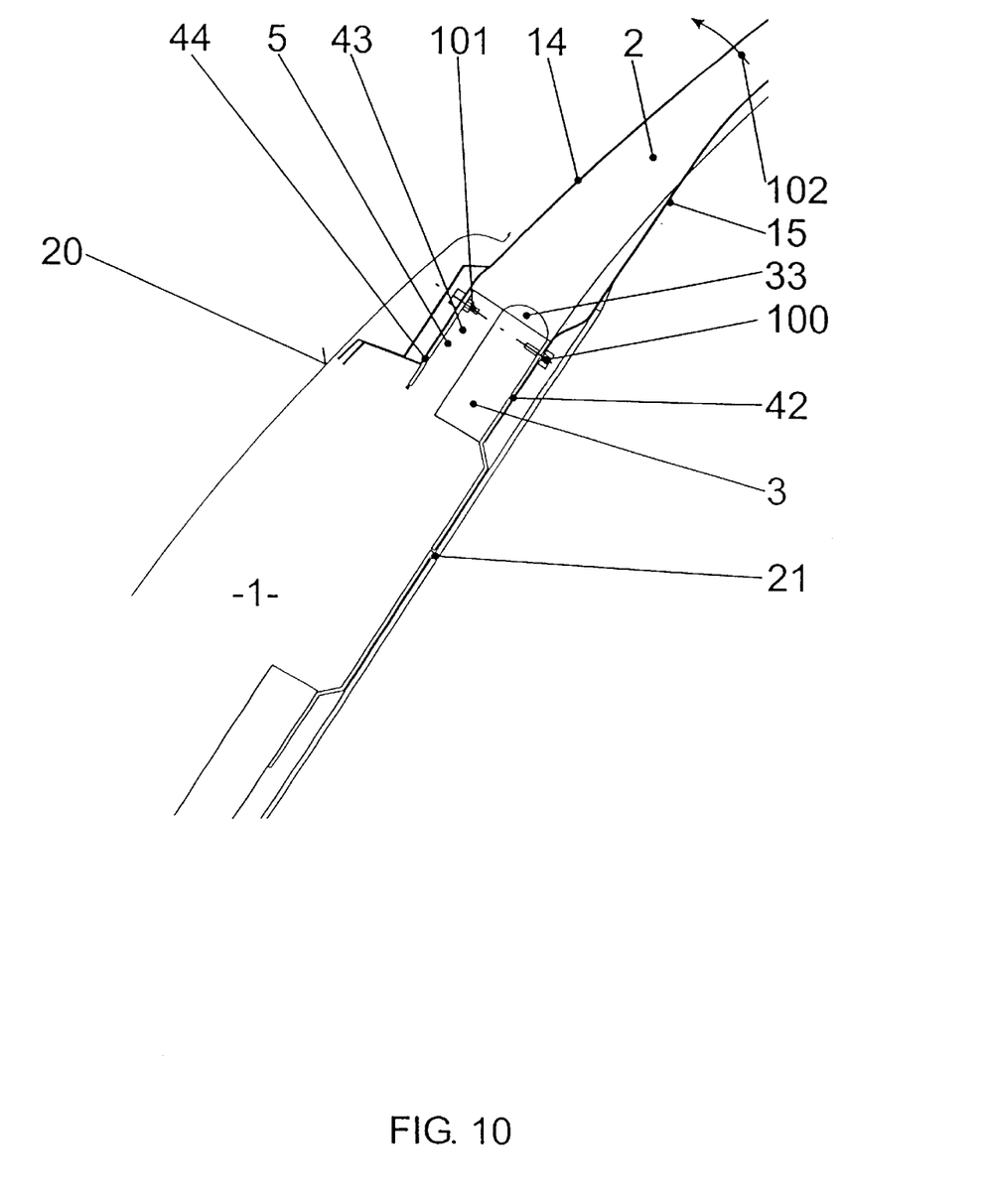
FIG. 10 shows a section 10—10 in FIG. 1

FIG. 10 is a vertical section in the region of the upper edge 33 of the supporting panel 3 and shows the fastening of the window frame 2 on the door. The window frame 2 comprises an outer window frame 14 and an inner window frame 15 which are connected to each other and rest on the upper edge 33 of the supporting panel 3 and of the frame plate 5. Its first limb 42 and the third limb 44 are parallel to each other and at some distance from each other. The inner window frame 15 is screwed to the first limb by means of a screw 100 (or by a number of screws). The screw 100 can at the same time be one of the screw bolts used to connect the frame plate 5 to the supporting panel 3. The outer window frame 14 is screwed to the third limb 44 of the frame plate 5 by means of bolts 101. For this purpose, vertical slots can be provided in the outer window frame 14 or in the third limb 44, for adjusting the angle of inclination 102 of the window frame 2 with respect to the basic door 1. By this means, tolerance compensation is also provided here and a dimensionally precise assembly of the door is possible. In the event of a frameless window, this section would essentially be identical to the one in FIG. 9.

What is claimed is:

1. Motor vehicle door, comprising a door inside part, a door outside part and a supporting panel which is connected in a tight-fitting manner to the door inside part, wherein
   a) the supporting panel, (3) is a structural part consisting of a reinforced plastic, extends essentially over a surface of the door and has an edge (30, 31, 32, 33) all the way around,
   b) a first frame plate (4) and a second frame plate (5) are connected to the edge of the supporting panel (3), said frame plates being folded profiles which extend along vertical parts of the edge and each having a first limb (42, 55) of which is directed parallel to the surface of the door (1) and a second limb (43, 56) of which is directed transversely to the surface of the door (1), the first limbs (42, 55) being connected to the edge (30, 31) of the supporting panel (3),
   c) the door inside part (19) is a shell consisting of plastic with first fitting surfaces (49') to which the second limbs (43, 56) of the first and second frame plates (4, 5) are fastened, at least over part of its length, and with a second fitting surface (83) to which the supporting panel (3) is fastened, and wherein the door inside part (19) forms shell parts (49) protruding outward over the supporting panel (3), and a connecting flange (50, 63),
   d) the door outside part (20) is a skin which is fastened to the connecting flange (50, 63) by means of positive fastening means (59).

2. The motor vehicle door as claimed in claim 1, wherein the first frame plate (4) is connected to hinges (6, 7) and the second frame plate (5) is connected to a door lock (9).

3. The motor vehicle door as claimed in claim 1, wherein a collision protection support (13) is fastened by its ends to the first and second frame plates (4, 5) outside the supporting panel (3).

4. The motor vehicle door as claimed in claim 3, wherein the profile of the first and second frame plates (4, 5) has, at least in part, a third limb (44, 57) which is approximately parallel to the first limb (42, 55) and is outside the latter.

5. The motor vehicle door as claimed in claim 4, wherein a collision protection support (13) is fastened to the third limb (44, 57).

6. The motor vehicle door as claimed in claim 5, wherein the first and second frame plates (4, 5) extend essentially as far as the upper edge (33) of the supporting panel (3), and wherein a separate window frame (2) is placed on an upper edge (33) of the supporting panel (3) and is fastened to the first limb (42, 55) and to the third limb (45, 57) of the profile.

7. The motor vehicle door as claimed in claim 1, wherein the supporting panel (3) comprises an inner wall and an outer wall consisting of fiber-reinforced plastic, which walls are connected to each other at least along the edge (30, 31, 32, 33) and cavities are formed between the walls.

8. The motor vehicle door as claimed in claim 7, wherein the supporting panel (3) has an aperture (40) which forms an inner edge and at which its walls are connected to each other.

9. The motor vehicle door as claimed in claim 1, wherein the supporting panel (3) has integrated metallic inserts (35, 36, 39) for fastening means (38, 45).

10. The motor vehicle door as claimed in claim 8, wherein the supporting panel (3) bears window guides (12) on a side facing the door outside part.

11. The motor vehicle door as claimed in claim 1, wherein the door inside part (19) has sockets on its surface facing the vehicle interior, for the attachment of insert parts.

12. The motor vehicle door as claimed in claim 1, wherein the door inside part (19) has, in its upper edge zone (90), a window seal (92) and plug-in elements (91) with which it is placed vertically onto the supporting panel (3).

13. The motor vehicle door as claimed in claim 1, wherein the door inside part (19) has a peripheral rubber seal (81) which bears against the supporting panel (3).

14. The motor vehicle door as claimed in claim 13, wherein cabling is pre-assembled on the inside of the door inside part (19).

15. The motor vehicle door as claimed in claim 1, wherein the door outside part (20) has, on its three edges which are connected to the door inside part (19), inwardly folded zones (51) with holes in which the positive fastening means (59) engage through holes in the connecting flange (50, 63).

16. The motor vehicle door as claimed in claim 14, wherein a sealing lip (53) is provided on the connecting flange (50, 63) on the door inside part (19), said sealing lip overlapping the positive fastening means (59) on that side of the door inside part (19) which faces away from the door outside part (20).

17. The motor vehicle door as claimed in claim 14, wherein the door outside part (20) has a reinforcement (94) and an outer window seal (93) on its upper edge.

* * * * *